US008072436B2

(12) United States Patent
Eriguchi et al.

(10) Patent No.: US 8,072,436 B2
(45) Date of Patent: Dec. 6, 2011

(54) SCREEN INPUT-TYPE IMAGE DISPLAY SYSTEM

(75) Inventors: Takuya Eriguchi, Yokosuka (JP); Yasuyuki Kudo, Tokyo (JP); Norio Mamba, Kawasaki (JP); Tsutomu Furuhashi, Yokohama (JP); Hideo Sato, Hitachi (JP)

(73) Assignees: Hitachi Displays, Ltd., Chiba (JP); Panasonic Liquid Crystal Display Co., Ltd., Hyogo-Ken (JP)

( * ) Notice: Subject to any disclaimer, the term of this patent is extended or adjusted under 35 U.S.C. 154(b) by 384 days.

(21) Appl. No.: 12/499,831

(22) Filed: Jul. 9, 2009

(65) Prior Publication Data
US 2010/0007628 A1 Jan. 14, 2010

(30) Foreign Application Priority Data
Jul. 9, 2008 (JP) .................................. 2008-178800

(51) Int. Cl.
*G06F 3/041* (2006.01)
(52) U.S. Cl. ..................................... 345/173; 178/18.06
(58) Field of Classification Search .......... 345/173–174; 178/18.01–18.06
See application file for complete search history.

(56) References Cited

U.S. PATENT DOCUMENTS

| 6,288,707 | B1 * | 9/2001 | Philipp | 345/168 |
| 7,821,274 | B2 * | 10/2010 | Philipp et al. | 324/662 |
| 7,821,502 | B2 * | 10/2010 | Hristov | 345/173 |
| 8,004,499 | B2 * | 8/2011 | Geaghan et al. | 345/173 |
| 2006/0250376 | A1 * | 11/2006 | Takahashi | 345/173 |
| 2008/0259044 | A1 * | 10/2008 | Utsunomiya et al. | 345/173 |
| 2009/0066670 | A1 | 3/2009 | Hotelling et al. | |
| 2009/0102813 | A1 * | 4/2009 | Mamba et al. | 345/174 |

FOREIGN PATENT DOCUMENTS

| JP | 2006-179035 | 7/2006 |
| JP | 2007-533044 | 11/2007 |

* cited by examiner

*Primary Examiner* — Amare Mengistu
*Assistant Examiner* — Hong Zhou
(74) *Attorney, Agent, or Firm* — Antonelli, Terry, Stout & Kraus, LLP.

(57) ABSTRACT

A touch sensor (3) comprises a plurality of X-coordinate electrodes, a plurality of Y-coordinate electrodes placed crossing the X-coordinate electrodes with an insulating layer therebetween, a plurality of X-coordinate auxiliary electrodes which are extended from X-coordinate electrodes, and a plurality of Y-coordinate auxiliary electrodes which are extended from Y-coordinate electrodes, the plurality of X and Y-coordinate electrodes being placed in a two-dimensional matrix form on a display surface of a display device (1) for detecting a change of capacitance due to pressing. A detection circuit (4) which detects a change in capacitance of the touch sensor (3), an analog-to-digital converter (5) which converts a detection output of the detection circuit (4) into digital data, a touch panel control circuit (6) which determines a touched coordinate, and a primary control circuit (7) which receives input of touch coordinate data from the touch panel control circuit (6) are provided.

6 Claims, 10 Drawing Sheets

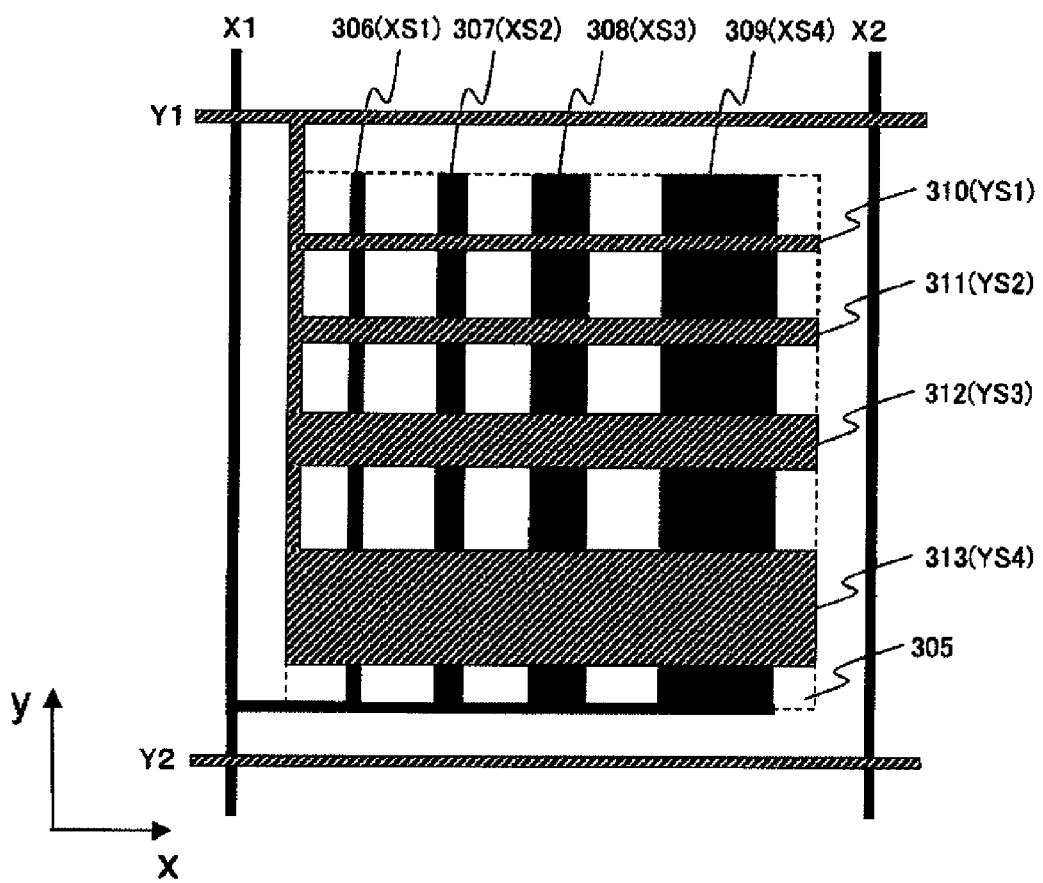
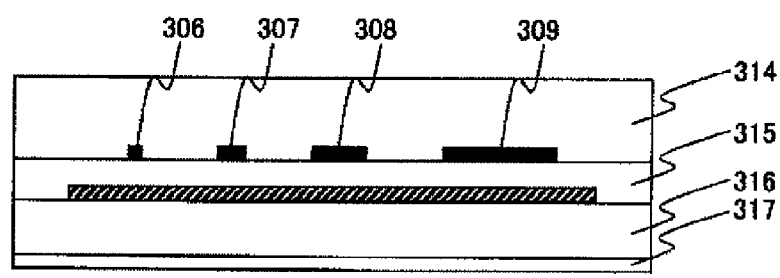
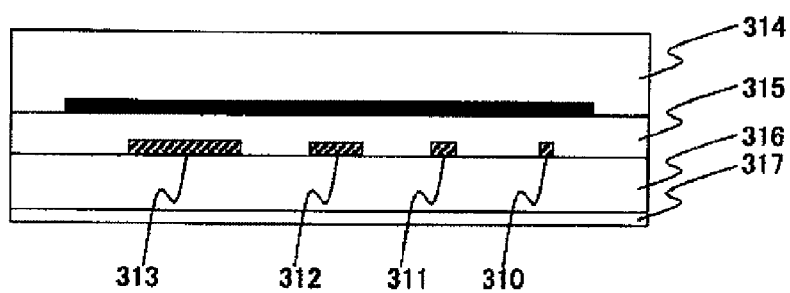

SCREEN INPUT-TYPE IMAGE DISPLAY SYSTEM

CROSS-REFERENCE TO RELATED APPLICATION

The present application claims priority from Japanese application JP 2008-178800 filed on Jul. 9, 2008, the content of which is hereby incorporated by reference into this application.

BACKGROUND OF THE INVENTION

1. Field of the Invention

The present invention relates to a screen input-type image display system, and in particular, to a screen input-type image display system having a capacitive coupling touch sensor which achieves a high resolution with a small number of electrodes.

2. Description of the Related Art

An image display device having a touch sensor (which is also called a touch panel) having a screen input function in which information is input through a touching operation (a contact and pressing operation; hereinafter simply referred to as "touch") on a display screen with a stylus pen or the like is used in a mobile electronic device such as a PDA and a portable terminal, various home electronic devices, and stationary customer guidance terminals such as an automatic reception machine. For such an image display device having a touch input function, a method of detecting a change in resistance or a change in capacitance of the portion which is touched and a method of detecting a change of an amount of light of the portion blocked by the touch are known.

In such an image display device having a touch sensor, in order to improve the operability of the user and realize a new application (for example, inputting a figure), a detection function with a high resolution is desired.

For a detection method of high resolution, for example, JP 2006-179035 A discloses an input device. The input device disclosed in JP 2006-179035 A comprises a first group of switches for applying signals from a transmitter to detection electrodes in the vertical direction (X electrodes) and a second group of switches for extracting signals on the electrodes in the horizontal direction (Y electrodes) which are arranged in a two-dimensional matrix in the vertical and horizontal directions, and a signal detection circuit (AM modulation circuit). In this structure, a signal is input from a transmitter to one X electrode selected by the first group of switches, Y electrodes are sequentially selected one by one by the second group of switches in this state, and it is detected in the AM modulation circuit whether or not an increase of the electrostatic capacity occurs in the X electrodes. The X electrodes to which the signal from the transmitter is applied are sequentially selected. A change of the electrostatic capacity at a touched location on the screen on which the information is input is detected by repeating these operations.

SUMMARY OF THE INVENTION

However, in the structure and operation disclosed in JP 2006-179035 A, if the resolution is to be improved corresponding to a case where the pressing area is reduced, the spacing between electrodes is narrowed (the numbers of electrodes of both X and Y coordinates are increased). Because of this, due to the increase in the number of electrodes, the circuit size of the groups of switches is increased and the cost is also increased, which is disadvantageous for application to a mobile device or the like which strictly requires small circuit size and low cost.

An advantage of the present invention is that a screen input-type image display system of a capacitive coupling type is provided in which the resolution is improved without increases in the circuit size of the electrodes of both X and Y coordinates and the circuit size of the peripheral circuit.

In order to achieve at least the advantage described above, according to one aspect of the present invention, an electrode pattern is formed in which a plurality of coordinate auxiliary electrodes having different line width extend from an X-coordinate electrode and a Y-coordinate electrode, and a space between the coordinate auxiliary electrodes for the X-coordinate electrode and the Y-coordinate electrode is set to a space smaller than a pressing area of an input element such as a stylus pen, so that a change in electrostatic capacity corresponding to a contact position is created.

According to various aspects of the present invention, the following structures are provided.

(1) A screen input-type image display system according to one aspect of the present invention is, for example, a screen input-type image display system having a touch sensor which detects a two-dimensional coordinate of a touched position on a display surface of a display device, wherein the touch sensor comprises a plurality of X-coordinate electrodes, a plurality of Y-coordinate electrodes which are placed crossing the X-coordinate electrodes with an insulating layer therebetween, a plurality of X-coordinate auxiliary electrodes which are extended in each area between the X-coordinate electrodes, and a plurality of Y-coordinate auxiliary electrodes which are extended in each area between the Y-coordinate electrodes, the X-coordinate electrode and the Y-coordinate electrodes being placed in a two-dimensional matrix form on the display surface of the display device for detecting a change in capacitance due to pressing, the screen input-type image display system comprises a detection circuit which detects a change of capacitance between the X-coordinate electrode and the Y-coordinate electrode, an analog-to-digital converter which converts a detection output of the detection circuit into digital data, a touch panel control circuit which determines a touched coordinate, a primary control circuit which receives an input of touch coordinate data of the touch panel control circuit and which integrally controls the overall device, and a display control circuit which controls display of the display device, and the primary control unit determines occurrence of touch by user and a coordinate of the touch from the touch coordinate data, supplies a display signal corresponding to the determined coordinate through the display control circuit to the display device, and reflects on the display.

(2) According to another aspect of the present invention, it is preferable that, in the screen input-type image display system of (1), the plurality of X-coordinate auxiliary electrodes extend from the X-coordinate electrode, and are formed with a same length and differing line widths from each other, and the plurality of Y-coordinate auxiliary electrodes placed opposing the plurality of X-coordinate auxiliary electrodes with the insulating layer therebetween extend from the Y-coordinate electrode, are formed with a same length and differing line widths from each other, and are placed crossing each of the X-coordinate auxiliary electrodes. And more preferably, the plurality of X-coordinate auxiliary electrodes extend in a direction parallel to the X-coordinate electrode and the plurality of Y-coordinate auxiliary electrodes extend in a direction parallel to the Y-coordinate electrode.

(3) According to another aspect of the present invention, it is preferable that, in the screen input-type image display system of (2), the plurality of X-coordinate auxiliary electrodes and the plurality of Y-coordinate auxiliary electrodes are formed in a region surrounded by a pair of adjacent X-coordinate electrodes and a pair of adjacent Y-coordinate electrodes.

(4) According to another aspect of the present invention, it is preferable that, in the screen input-type image display system of (2), the plurality of X-coordinate auxiliary electrodes have line widths which are sequentially increased along a direction of provision of the plurality of X-coordinate auxiliary electrodes.

(5) According to another aspect of the present invention, it is preferable that, in the screen input-type image display system of (2), the plurality of Y-coordinate auxiliary electrodes have line widths which are sequentially increased along a direction of provision of the plurality of Y-coordinate auxiliary electrodes.

(6) According to another aspect of the present invention, it is preferable that, in the screen input-type image display system of (1), the touch panel control circuit determines, from digital data of the plurality of X-coordinate electrodes output from the analog-to-digital converter, a coordinate of an X-coordinate electrode showing a digital data value having a greatest difference from a digital data value at the time of non-contact as a contact coordinate, determines, from digital data of the plurality of Y-coordinate electrodes output from the analog-to-digital converter, a coordinate of a Y-coordinate electrode showing a digital data value having a greatest difference from a digital data value at the time of non-contact as a contact coordinate, determines a coordinate of a touched X-coordinate auxiliary electrode from among the plurality of X-coordinate auxiliary electrodes according to a level of a digital data value of the X-coordinate electrode showing the digital data value having the greatest difference from the digital data value at the time of non-contact, and determines a coordinate of a touched Y-coordinate auxiliary electrode from among the plurality of Y-coordinate auxiliary electrodes according to a level of a digital data value of the Y-coordinate electrode showing the digital data value having the greatest difference from the digital data value at the time of non-contact, to output a coordinate of the contact position.

(7) According to another aspect of the present invention, it is preferable that, in the screen input-type image display system of (6), the touch panel control circuit comprises a storage circuit which stores a digital data value when each of the X-coordinate auxiliary electrodes or each of the Y-coordinate auxiliary electrodes is touched, and the coordinates of the touched X-coordinate auxiliary electrode and the touched Y-coordinate auxiliary electrode are determined by comparing the digital data value of a touched X-coordinate electrode and a touched Y-coordinate electrode with a value stored in the storage circuit.

(8) According to another aspect of the present invention, it is preferable that, in the screen input-type image display system of (7), if a difference in a digital data value is caused in each touched X-coordinate electrode and each touched Y-coordinate electrode and the difference in the digital data value can be calculated from a predetermined coefficient corresponding to coordinates of the X-coordinate electrode and the Y-coordinate electrode, the storage circuit stores the coefficient, and a digital data value of the X-coordinate auxiliary electrode and the Y-coordinate auxiliary electrode for each line which forms a coordinate determination reference is calculated from the coordinates of the touched X-coordinate electrode and the touched Y-coordinate electrode, the coefficient stored in the storage circuit, and the digital data values when each X-coordinate auxiliary electrode and each Y-coordinate auxiliary electrode are touched stored in the storage circuit, the digital data values of the touched X-coordinate electrode and the touched Y-coordinate electrode are compared with the calculated digital data values of the X-coordinate auxiliary electrodes and the Y-coordinate auxiliary electrodes for each line which forms the determination reference, and the coordinates of the touched X-coordinate auxiliary electrode and the touched Y-coordinate auxiliary electrode are determined.

(9) According to another aspect of the present invention, it is preferable that, in the screen input-type image display system of (7), if a difference in a digital data value is caused in each touched X-coordinate electrode and each touched Y-coordinate electrode, digital data values when touched for each X-coordinate auxiliary electrode for each X-coordinate electrode and for each Y-coordinate auxiliary electrode for each Y-coordinate electrode are stored in the storage circuit, the digital data values of the touched X-coordinate electrode and the touched Y-coordinate electrode are compared with the digital data values for each X-coordinate auxiliary electrode for each X-coordinate electrode and for each Y-coordinate auxiliary electrode for each Y-coordinate electrode stored in the storage circuit, and the coordinates of the touched X-coordinate auxiliary electrode and the touched Y-coordinate auxiliary electrode are determined.

(10) According to another aspect of the present invention, it is preferable that, in the screen input-type image display system of (1), the plurality of Y-coordinate auxiliary electrodes have a same triangular shape extending in a direction perpendicular to the Y-coordinate electrode, and are alternately arranged without crossing the X-coordinate auxiliary electrodes which are placed opposing the Y-coordinate auxiliary electrode with the insulating film therebetween.

(11) According to another aspect of the present invention, it is preferable that, in the screen input-type image display system of (10), the plurality of X-coordinate auxiliary electrodes and the plurality of Y-coordinate auxiliary electrodes are formed in a region surrounded by a pair of adjacent X-coordinate electrodes and a pair of adjacent Y-coordinate electrodes.

(12) According to another aspect of the present invention, it is preferable that, in the screen input-type image display system of (10), the plurality of X-coordinate auxiliary electrodes extend in a same direction as a direction of extension of the Y-coordinate auxiliary electrodes and have a same length and differing line widths from each other.

(13) According to another aspect of the present invention, it is preferable that, in the screen input-type image display system of (12), the plurality of X-coordinate auxiliary electrodes have the line widths sequentially increased along a direction of provision of the plurality of X-coordinate auxiliary electrodes.

(14) According to another aspect of the present invention, it is preferable that, in the screen input-type image display system of (10), the Y-coordinate auxiliary electrodes having the triangular shape are connected to the Y-coordinate electrode at a wide-width section of the Y-coordinate auxiliary electrode.

(15) According to another aspect of the present invention, it is preferable that, in the screen input-type image display system of (10), the Y-coordinate auxiliary electrode having the triangular shape is connected to the Y-coordinate electrode at a narrow-width section of the Y-coordinate auxiliary electrode.

The above-described configurations are merely exemplary, and various modifications are possible within the scope and spirit of the present invention. Example configurations of the present invention other than those described above will become apparent from the description of the overall specification and drawings.

According to the screen input-type image display system of various aspects of the present invention, an electrode pattern is formed in which a plurality of coordinate auxiliary electrodes having different line widths extend from the X-coordinate electrode and Y-coordinate electrode, a coordinate of the X-coordinate electrode showing a digital data value having the greatest difference from the digital data value at the time of non-contact is determined as a contact coordinate from among the digital data of the plurality of X-coordinate electrodes and the plurality of Y-coordinate electrodes output from the analog-to-digital converter, and a touched coordinate is determined from among the plurality of X-coordinate auxiliary electrodes and the Y-coordinate auxiliary electrodes according to a level of the digital data value of the X-coordinate electrode and the Y-coordinate electrode showing the digital data value having the greatest difference from the digital data value at the time of non-contact. With this structure, a coordinate detection of high resolution is enabled even with a small pressing area smaller than the electrode space, and, thus, the operability of the user can be improved. In addition, because the numbers of X-coordinate electrodes and the Y-coordinate electrodes are not increased, the increase in the circuit size and cost can be suppressed.

Other advantages of the present invention will become apparent from the description of the specification.

BRIEF DESCRIPTION OF THE DRAWINGS

FIG. 3A is a diagrammatic plan view for explaining an example electrode pattern of X and Y electrodes included in a touch panel according to a first preferred embodiment of the present invention.

FIG. 3B is a diagrammatic plan view for explaining an example electrode pattern of X and Y electrodes included in a touch panel according to a first preferred embodiment of the present invention.

FIG. 3C is a diagrammatic plan view for explaining an example electrode pattern of X and Y electrodes included in a touch panel according to a first preferred embodiment of the present invention.

DETAILED DESCRIPTION OF THE INVENTION

Preferred embodiments of the present invention will now be described in detail with reference to the drawings.

First Preferred Embodiment

Figure 1:
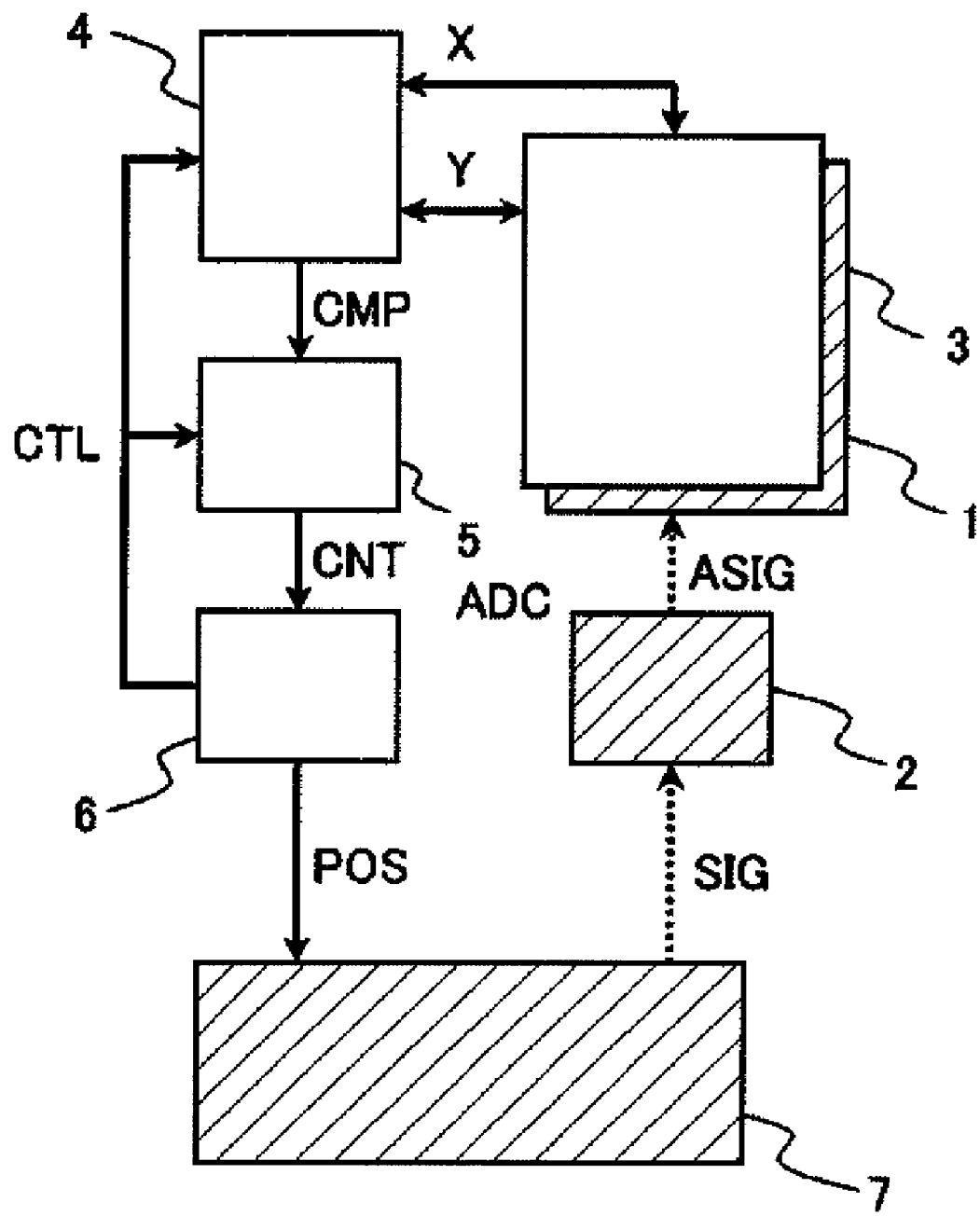
FIG. 1 is a schematic structural diagram for explaining a screen input-type image display system according to a first preferred embodiment of the present invention.

FIG. 1 is a schematic structural diagram showing a screen input-type image display system according to a first preferred embodiment of the present invention. In FIG. 1, a touch panel 3 is affixed over a display device 1 in an overlapping manner, to form a screen input-type image display device. The display device 1 is, for example, a liquid crystal display panel, an organic EL panel, or the like. The touch panel 3 is a touch panel of an electrostatic capacitance coupling type, and a capacitance change due to contact (touch) of a stylus pen or the like on the touch panel 3 is detected by a detection circuit 4. A detection output CMP of the detection circuit 4 based on the detection result of the capacitance change is sent through an analog-to-digital converter (ADC) 5 to a touch panel control circuit 6, and the touched coordinates (X coordinate and Y coordinate) are determined. The determined touch coordinate data POS is sent to a primary control circuit (which comprises a system control circuit, a microcomputer, a CPU, etc.) 7 which controls the overall screen input-type image display device. The primary control circuit 7 determines occurrence of the touch by the user and the coordinate of the touch based on the touch coordinate data POS, supplies a display signal SIG corresponding to the coordinates through a display control circuit 2 to the display device 1, and reflects on the display. The detection circuit 4 and the ADC 5 are controlled by a touch panel control circuit 6.

Figure 2:
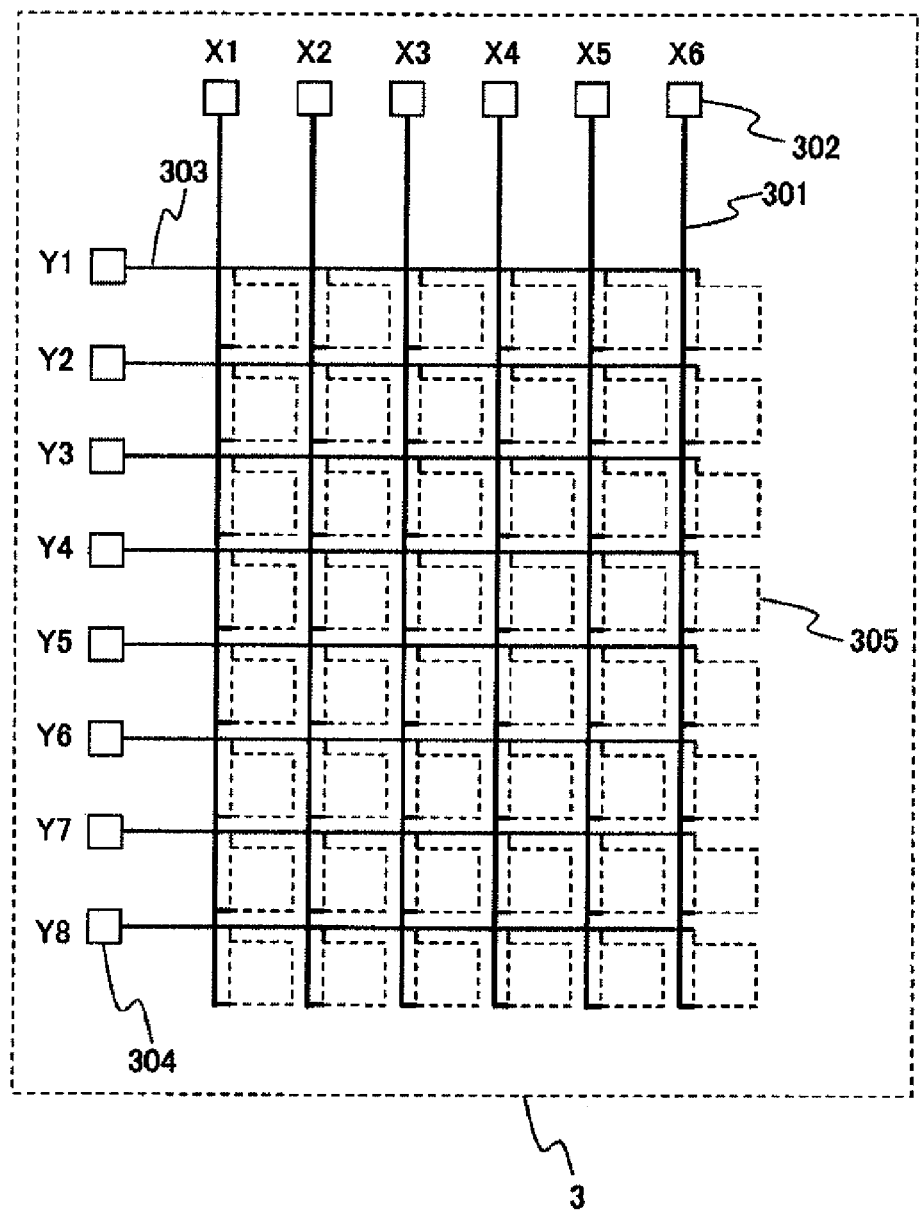
FIG. 2 is a diagrammatic plan view for explaining an example structure of a touch panel included in a screen input-type image display system according to a first preferred embodiment of the present invention.

FIG. 2 is a diagrammatic plan view for explaining an example structure of a touch panel 3 according to a first preferred embodiment of the present invention. In FIG. 2, in order to detect a capacitance change of the touch panel 3 by touch, a plurality of X-coordinate electrodes 301 and a plurality of Y-coordinate electrodes 303 are placed, and a plurality of X and Y electrodes 305 which are connected to the X-coordinate electrodes and the Y-coordinate electrodes are placed. Although not shown in the figure, an insulating layer (dielectric layer) exists between the X-coordinate electrodes 301 and the Y-coordinate electrodes 303. In addition, between the X-coordinate electrode 301 and the Y-coordinate electrode 303, a capacity of the electrodes themselves is formed such as an interlayer capacitor and a fringe capacitor. Moreover, a protection film (not shown) which protects the electrode from degradation is formed on a surface to be touched. The X-coordinate electrodes 301 and the Y-coordinate electrodes 303 are connected through their respective terminals (X-coordinate electrode terminals 302 and Y-coordinate electrode terminals 304) to the detection circuit 4 shown in FIG. 1.

FIGS. 3A-3C are diagrams for explaining a specific electrode pattern of the X and Y electrodes 305 shown in FIG. 2. FIG. 3A is a plan view of the electrode pattern. In FIG. 3A, derives from the X-coordinate electrode (for example, X1) and extends in a y direction. A coordinate auxiliary electrode XS1 (306), a coordinate auxiliary electrode XS2 (307), a coordinate auxiliary electrode XS3 (308), and a coordinate auxiliary electrode XS4 (309) extend from the branching part of the X-coordinate electrode and in parallel to the X-coordinate electrode. The coordinate auxiliary electrode XS1~XS4 extend parallel to each other. Similarly, in FIG. 3A, a branching part of the Y-coordinate electrode derives from the Y-coordinate electrode (for example, Y1) extends in an x direction. A coordinate auxiliary electrode YS1 (310), a coordinate auxiliary electrode YS2 (311), a coordinate auxiliary electrode YS3 (312), and a coordinate auxiliary electrode YS4 (313) extend from the branching part of the X-coordinate electrode and in parallel to the Y-coordinate electrode. The coordinate auxiliary electrode YS1~YS4 extend parallel to each other. With this structure, the X and Y electrodes 305 comprise the group of coordinate auxiliary electrodes XS1~XS4 and the group of coordinate auxiliary electrodes YS1~YS4, and have a mesh-shaped pattern by the coordinate auxiliary electrodes. The coordinate auxiliary electrodes for the X-coordinate electrode (hereinafter referred to as "X-coordinate auxiliary electrode") have the same length and different line widths from each other in a relationship of XS1 (306)<XS2 (307)<XS3 (308)<XS4 (309). Similarly, the coordinate auxiliary electrodes for the Y-coordinate electrode (hereinafter referred to as "Y-coordinate auxiliary electrode") have the same length and different line widths from each other in a relationship of YS1 (310)<YS2 (311)<YS3 (312)<YS4 (313). The space between adjacent X-coordinate auxiliary electrodes is set to be smaller than a pressing area of an input element such as the stylus pen. Similarly, the space between adjacent Y-coordinate auxiliary electrodes is set to be smaller than the pressing area of the input element such as the stylus pen. This is because, if the pressing area of the input element such as the stylus pen is smaller than the space between the X-coordinate auxiliary electrodes and the space between the Y-coordinate auxiliary electrodes, and the touched location is at a location between the X-coordinate auxiliary electrodes or a location between the Y-coordinate auxiliary electrodes, the change in the electrostatic capacity does not occur and the touched coordinate cannot be detected. Thus, the structure is employed to avoid this. FIG. 3B is cross sectional diagram seen from the lower side of FIG. 3A and FIG. 3C is a cross sectional diagram seen from a right side of FIG. 3A. Reference numeral 314 represents a protection film, reference numeral 315 represents an insulating film (dielectric layer), reference numeral 316 represents a shield, and reference numeral 317 represents a substrate. The insulating film 315 is interposed between the X-coordinate auxiliary electrodes 306~309 and the Y-coordinate auxiliary electrodes 310~313, and a capacity of the electrodes themselves such as an interlayer capacitor, a fringe capacitor, and an intersecting capacitor is formed between the X-coordinate auxiliary electrodes 306~309 and the Y-coordinate auxiliary electrodes 310~313. In addition, the protection film 314 for protecting the X and Y electrodes from degradation is formed on the surface to be touched. In this manner, by setting the line widths of the X-coordinate auxiliary electrodes 306~309 and the Y-coordinate auxiliary electrodes 310~313 to differ from each other, it is possible to set the change of the electrostatic capacitance when the coordinate auxiliary electrode is touched to different values, and a change of the electrostatic capacity which corresponds to the position can be created. In the electrode pattern shown in FIGS. 3A-3C, the relationships of the line widths of the X- and Y-coordinate auxiliary electrodes are set to XS1<XS2<XS3<XS4 and YS1<YS2<YS3<YS4, but the present invention is not limited to such a configuration, and the line widths can be set in different relationships as long as it is possible to have different changes of electrostatic capacitance when the coordinate auxiliary electrodes are touched and a change of electrostatic capacitance for which the coordinate can be detected in the detection circuit 4 to be described later can be obtained for each coordinate auxiliary electrode. In addition, in the present embodiment, the numbers of X- and Y-coordinate auxiliary electrodes are each set to four, but the present invention is not limited to such a configuration, and, for example, the number of X-coordinate auxiliary electrodes may be increased to achieve a higher resolution as long as the below-described equation 1 can be satisfied with. In the equation 1, the length from the Y1-coordinate electrode to the Y2-coordinate electrode is defined as Ly, the minimum space between X-coordinate auxiliary electrodes is defined as Wx, the minimum line width of the X-coordinate auxiliary electrodes is defined as Ax, the minimum difference of line width of the X-coordinate auxiliary electrodes for which the coordinates can be detected by the detection circuit 4 to described later for each coordinate auxiliary electrode is defined as Bx, and the target number of X-coordinate auxiliary electrodes is defined as Cx. Similarly, the number of Y-coordinate auxiliary electrodes may be increased to achieve a higher resolution as long as the below-described equation 2 can be satisfied with the length from the X1-coordinate electrode to the X2-coordinate electrode being Lx, the minimum space between Y-coordinate auxiliary electrodes being Wy, the minimum line width of the Y-coordinate auxiliary electrodes being Ay, the minimum difference in line width of the Y-coordinate auxiliary electrodes for which the coordinates can be detected by the detection circuit 4 to be described later for each coordinate auxiliary electrode being By, and the target number of Y-coordinate auxiliary electrodes being Cy.

(Equation 1)

$$Wx(Cx+1) + \sum_{i=0}^{Cx}(Ax + Bxi) \leq Ly. \qquad (1)$$

(Equation 2)

$$Wy(Cy+1) + \sum_{i=0}^{Cy}(Ay + Byi) \leq Lx. \qquad (2)$$

Figure 4:
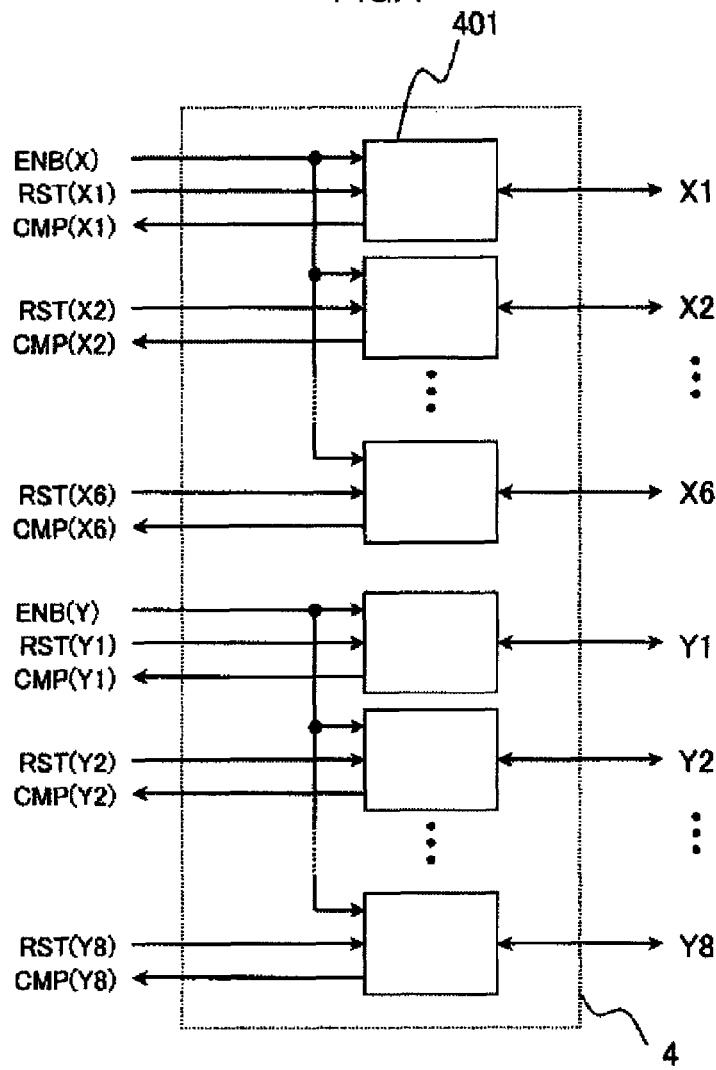
FIG. 4 is a block diagram for explaining an example detection circuit according to a first preferred embodiment of the present invention.

FIG. 4 is a block diagram for explaining an example structure of the detection circuit 4 of the first preferred embodiment of the present invention. In detection circuit 4, a capacitance detection circuit 401 connected to each of the X-coordinate electrodes (X1, X2, . . . , X6) and the Y-coordinate electrodes (Y1, Y2, . . . , Y8) is provided. An enable signal ENB and a reset signal RST are supplied from the touch panel control circuit 6 shown in FIG. 1 to each capacitance detection circuit 401, and a detection output CMP is output to the analog-to-digital converter (ADC) 5. The enable signal ENB and the reset signal RST are included in a control signal CTL. The detection output CMP is a pulse signal in which the width changes corresponding to a change of the electrostatic capacity. The present invention is not limited to such a configuration, and the detection circuit may be any circuit which can detect in analog or digital a change of capacitance between the X and Y coordinate electrodes.

Figure 5:
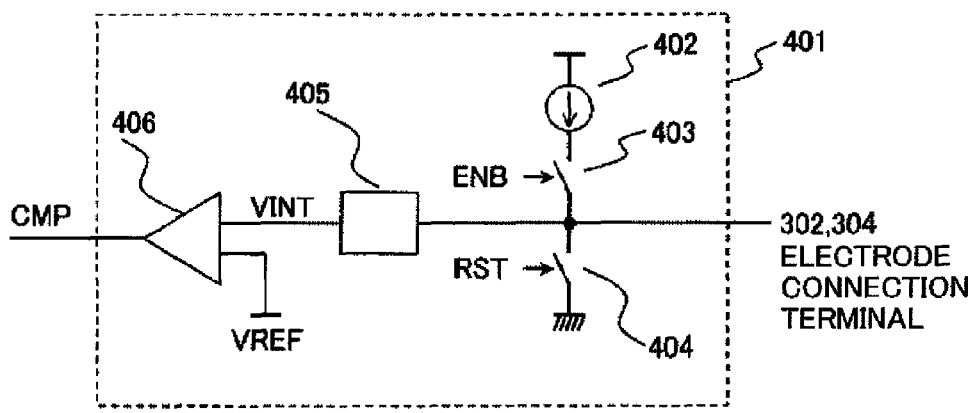
FIG. 5 is a diagram for explaining an example capacitance detection circuit in a detection circuit according to a first preferred embodiment of the present invention.

FIG. 5 is a diagram for explaining a specific example structure of the capacitance detection circuit 401 shown in FIG. 4. Reference numeral 402 represents a current source, reference numerals 403 and 404 represent switches, reference numeral 405 represents a low-pass filter and a buffer amplifier, and reference numeral 406 represents a comparator. In this circuit, in an initial state, the switch 404 is switched ON with the reset signal RST, and each electrode is reset to the ground potential GND. During the detection, the switch 403 is switched ON (and the switch 404 is switched OFF) with the enable signal, the capacitance component connected to the X-coordinate electrode and Y-coordinate electrode connected to the electrode connection terminals (302 and 304) are charged from the current source 402, and the time required for the charge is detected by the comparator 406. In this process, because the time for reaching a certain potential is elongated when the capacitance detected at the X-coordinate electrode and the Y-coordinate electrode for detecting coordinates is increased by touching, the change in capacitance is reflected in the output result CMP of the comparator 406.

The output result CMP of the comparator 406 is converted by the ADC 5 shown in FIG. 1 into digital data. In the present embodiment, the ADC 5 calculates a period in which the enable signal ENG is valid (ON) and the output result CMP is at the low level, and outputs the result as digital data CNT. As an example of the ADC 5, a counter which counts the pulses of the digital data CNT only for the period in which the enable signal ENB is valid and the output result CMP is at the low level may be provided.

Figure 6:
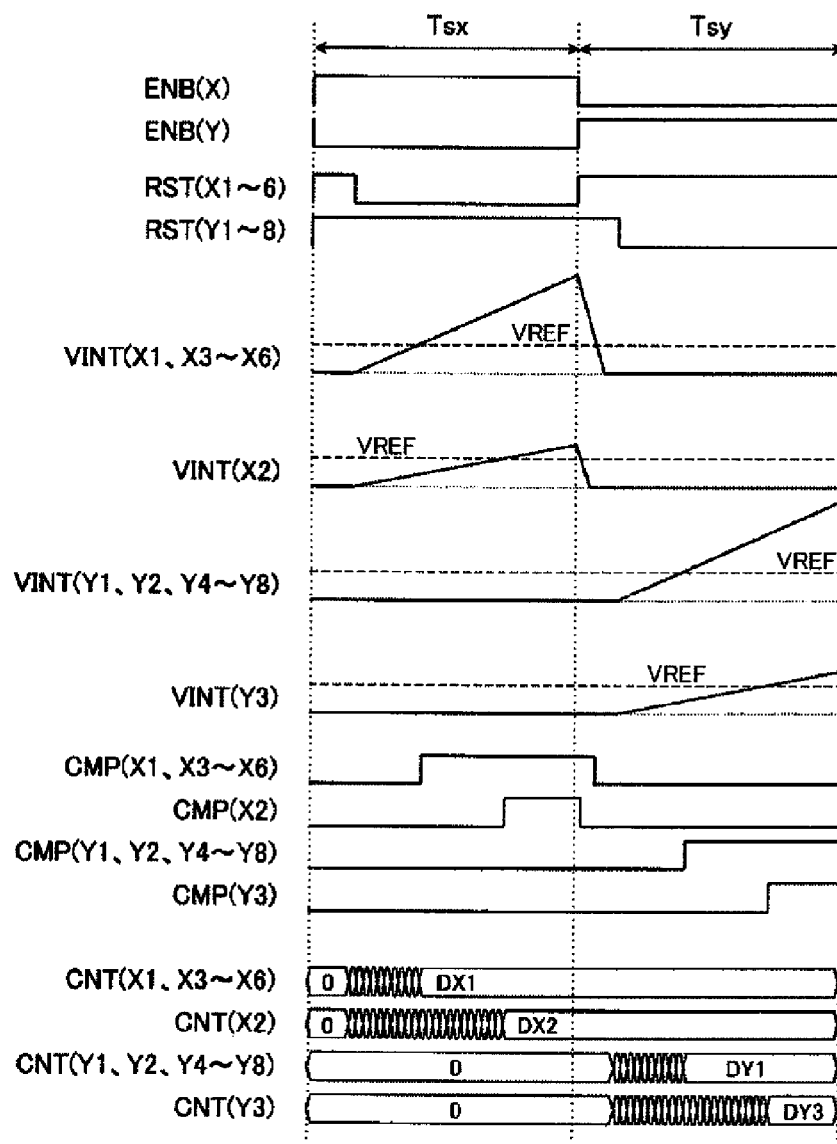
FIG. 6 is a waveform and timing diagram for explaining a period for detecting a signal in an X-coordinate electrode and Y-coordinate electrode for detecting a coordinate according to a first preferred embodiment of the present invention.

FIG. 6 is a waveform and timing diagram for explaining a period in which all signals of the X-coordinate electrode and the Y-coordinate electrode are detected, for detecting the coordinate in the first preferred embodiment. As shown in FIG. 6, the reset signal RST (X1~X6 and Y1~Y8) and the enable signals ENB (X) and ENB (Y) corresponding to the RST (X1~X6 and Y1~Y8) rise and the capacitance detection circuit 401 operates. In a period Tsx in which the X-coordinate electrode is detected, the Y-coordinate electrodes are connected to the ground GND, and, in a period Tsy in which the Y-coordinate electrode is detected, the X-coordinate electrodes are connected to the ground potential GND. However, the process on the electrodes other than the electrodes of the coordinate to be detected is not limited to this process (may be other processes such as GND connection or high impedance connection). Here, because the capacitance component in the electrode (coordinate electrode X2 and coordinate electrode Y3) at a location which is being selected by the touch is increased, the time required for charging of charges is elongated, and the time until a set reference voltage is exceeded is also elongated. Correspondingly, the digital data CNT has a relationship of DX2>DX1 and DY3>DY1 for digital data CNT (X1, X2) (Y1, Y3). In other words, for example, the charging time of charges in the touched X-coordinate electrode is as shown by VINT (X2) and the charging times of charges of the X-coordinate electrodes which are not touched are as shown by VINT (X1, X3~X6). This similarly applies to the Y-coordinate electrodes.

Figure 7:
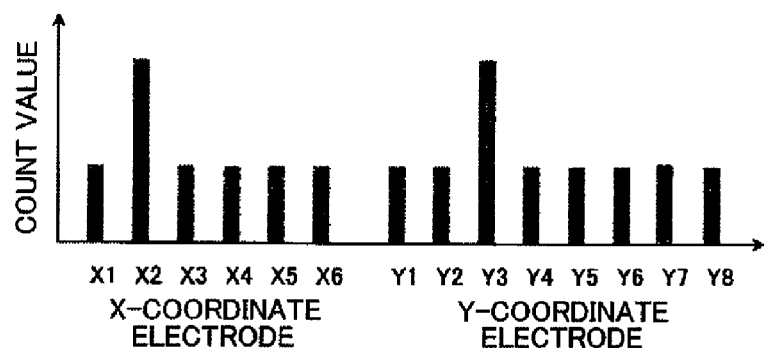
FIG. 7 is a diagram showing a pulse count value of digital data obtained through an operation explained in FIG. 6.

FIG. 7 is a diagram showing a pulse count value of digital data obtained in a first detection period by an operation explained with reference to FIG. 6. In FIG. 7, the horizontal axis shows the X-coordinate electrodes (X1, X2, X3, X4, X5, and X6) and the Y-coordinate electrodes (Y1, Y2, Y3, Y4, Y5, Y6, Y7, and Y8) and the vertical axis shows the pulse count values of the digital data for the X-coordinate electrodes and the Y-coordinate electrodes (in FIG. 7, pulse count value is simply shown as count value). In FIG. 7, a peak for the X-coordinate electrodes is at X2 and a peak for the Y-coordinate electrodes is at Y3, and, thus, the touched X coordinate and Y coordinate can be detected.

Figure 8:
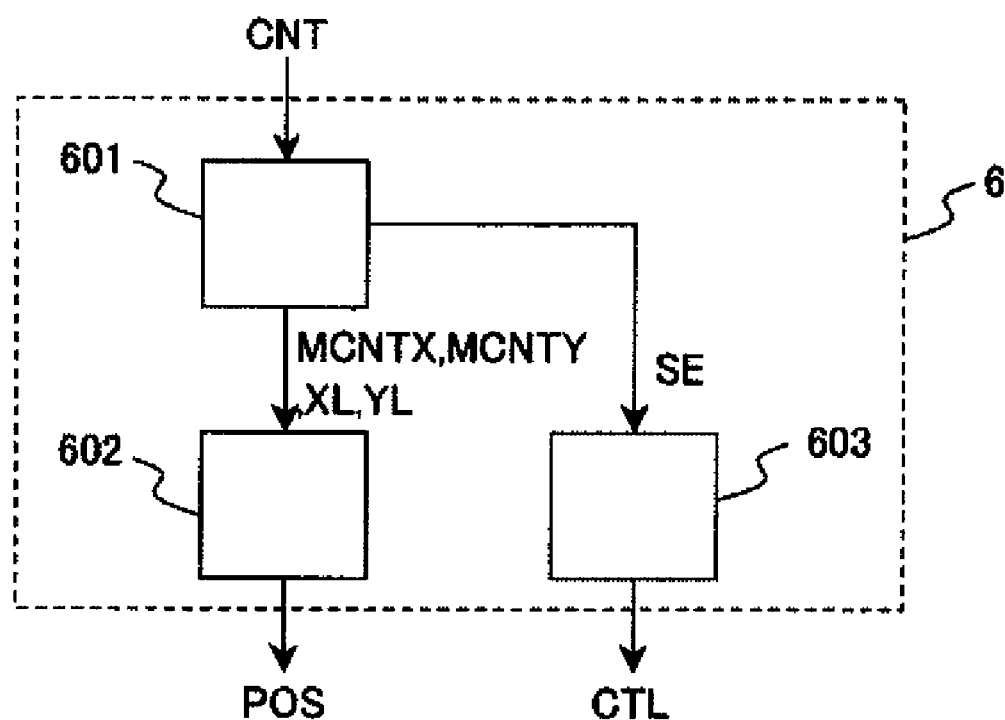
FIG. 8 is a diagram for explaining an example touch panel control circuit according to a first preferred embodiment of the present invention.

FIG. 8 is a diagram for explaining a specific example structure of the touch panel control circuit 6 shown in FIG. 1. In the touch panel control circuit 6, a peak coordinate detection unit 601 detects, from the digital data CNT detected based on signals of the electrodes for detecting the X-coordinate electrode and the Y-coordinate electrode, coordinates (XL/YL) where the count values of the output pulses of the X-coordinate electrode and the Y-coordinate electrode are the maximum and peak values at the X-coordinate electrode and the Y-coordinate electrode (MCNTX/MCNTY). A drive controller 603 outputs the control signal CTL according to a process completion signal SE of the peak coordinate detection unit 601.

A calculation processor 602 detects, from XL/YL/MCNTX/MCNTY which are output from the peak coordinate detection unit 601, coordinates (XSOUT/YSOUT) of coordinate auxiliary electrodes for X-coordinate electrodes and Y-coordinate electrodes shown in FIG. 3, and outputs to the primary control circuit 7 as coordinate data POS along with XL/YL.

Figure 9:
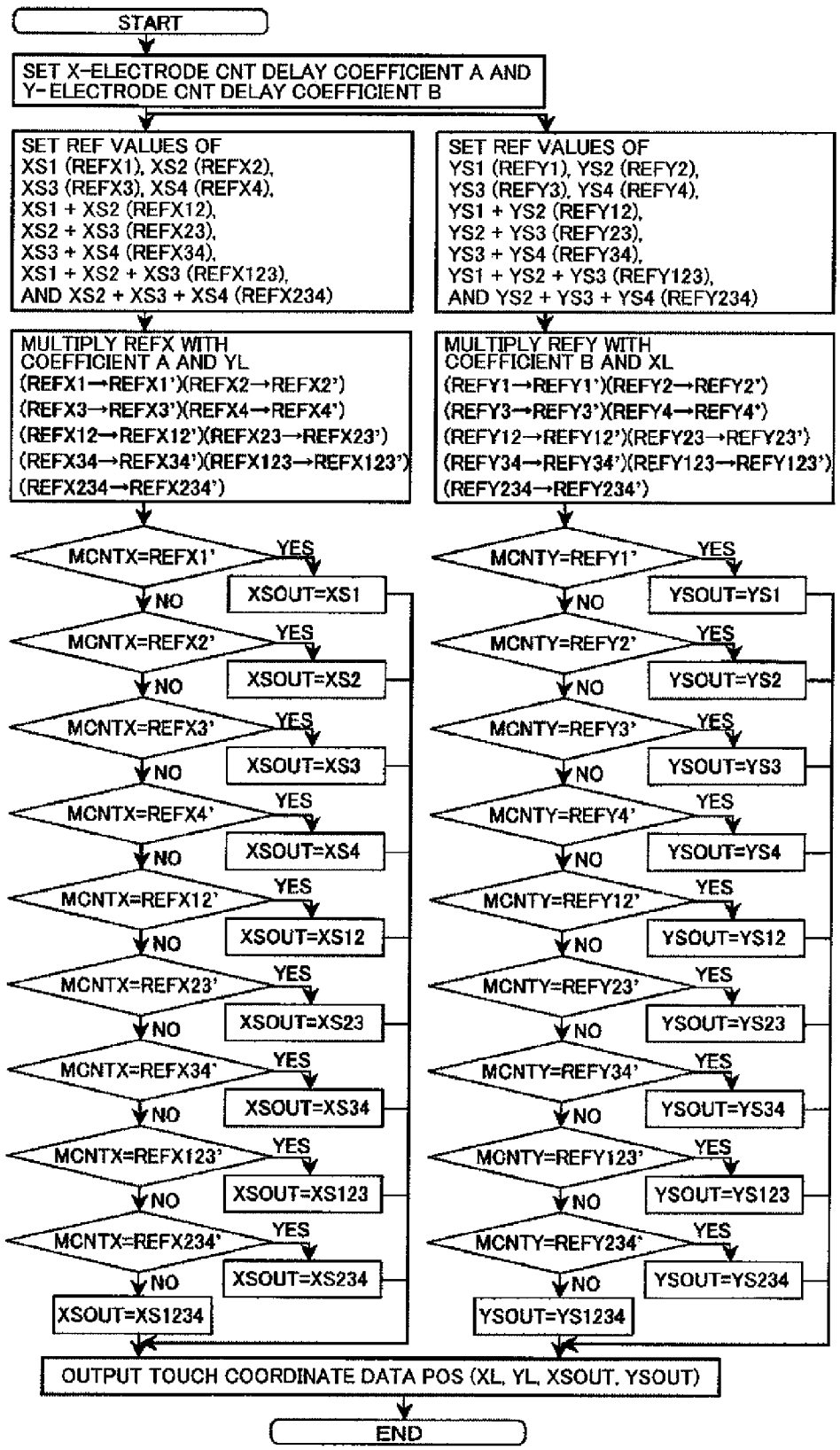
FIG. 9 is a flowchart for explaining a sequence of a calculation processor in a touch panel control circuit according to a first preferred embodiment of the present invention.
Figure 10:
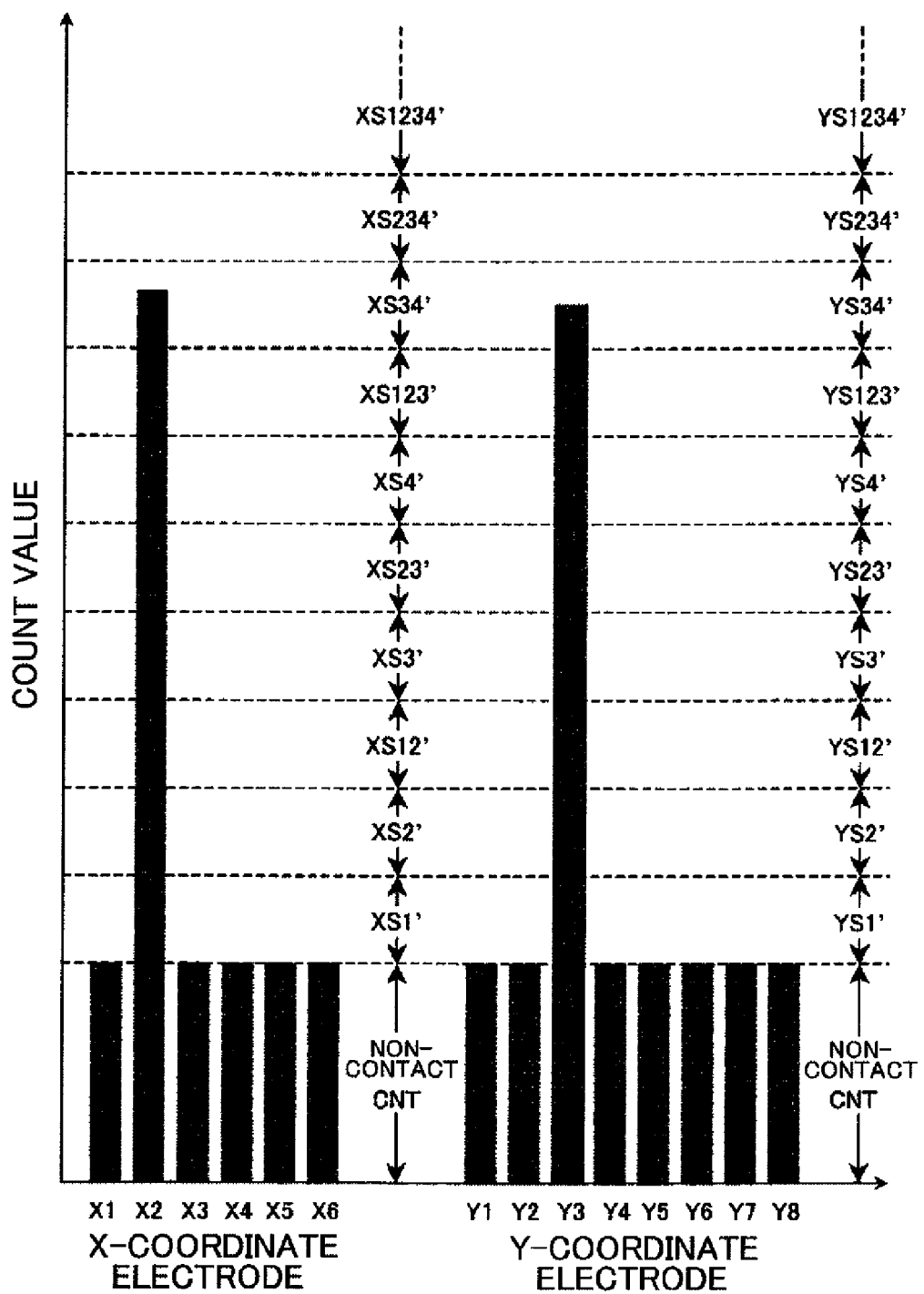
FIG. 10 is diagram for explaining a pulse count value of digital data and a count range of the touched coordinate auxiliary electrode explained in FIG. 7.

FIGS. 9 and 10 show a flowchart and a graph for explaining an example sequence of the calculation processor of FIG. 8. First, a coefficient A and a coefficient B stored in a register are set. In general, in the X and Y electrodes which are closest to the X and Y coordinate electrode terminals and the X and Y electrodes which are farthest away from the X and Y coordinate electrode terminals, because of the influences of line resistance, parasitic capacity, etc., the waveform in VINT of the X and Y electrodes farthest away is blunt compared to the waveform of VINT of the X and Y electrodes closest to the X electrode 302 (refer to FIG. 2) and the Y electrode 304 (refer to FIG. 2), and the CNT value is increased. In consideration of this, in order to determine an accurate CNT value corresponding to the line of the touched electrode, the CNT increasing coefficient in units of lines due to the influences of the line resistance, parasitic capacity, etc. is set as the coefficient A (for X-coordinate electrode) and the coefficient B (for Y-coordinate electrode), which are stored in the register.

Then, REFX1 (CNT when XS1 is contacted), REFX2 (CNT when XS2 is contacted), REFX3 (CNT when XS3 is contacted), REFX4 (CNT when XS4 is contacted), REFX12 (CNT when both XS1 and XS2 are contacted), REFX23 (CNT when both XS2 and XS3 are contacted), REFX34 (CNT when both XS3 and XS4 are contacted), REFX123 (CNT when all of XS1, XS2, and XS3 are contacted), REFX234 (CNT when all of XS2, XS3, and XS4 are contacted), REFY1 (CNT when YS1 is contacted), REFY2 (CNT when YS2 is contacted), REFY3 (CNT when YS3 is contacted), REFY4 (CNT when YS4 is contacted), REFY12 (CNT when both YS1 and YS2 are contacted), REFY23 (CNT when both YS2 and YS3 are contacted), REFY34 (CNT when both YS3 and YS4 are contacted), REFY123 (CNT when all of YS1, YS2, and YS3 are contacted), and REFY234 (CNT when all of YS2, YS3, and YS4 are contacted) which are CNTs based for the X and Y coordinate auxiliary electrodes (XS1~XS3/YS1~YS3) closest to the X and Y coordinate electrode terminals are set as reference CNTs to the register.

Then, REFX' is calculated which is a value obtained by multiplying REFX which is the set reference CNT as described above by the coefficient A and YL which is output from the peak coordinate detection unit 601. Similarly, REFY' is calculated which is a value obtained by multiplying REFY which is the set reference CNT as described above by the coefficient B and XL which is output from the peak coordinate detection unit 601.

Next, MCNTX and MCNTY which are output from the peak coordinate detection unit 601 are compared to each REFX' and REFY' which are calculated as described above. For the comparison method, as shown in FIG. 10, if the relationship of the CNT value at the touched X-coordinate auxiliary electrode (=line width of the touched auxiliary electrode) is such that the line width of XS1=1, the line width of XS2=2, the line width of XS3=4, and the line width of XS4=6, REFX1' (line width of XS1)<REFX2' (line width of XS2)<REFX12' (line width of XS1+line width of XS2) <REFX3' (line width of XS3)<REFX23' (line width of XS2+ line width of XS3)<REFX4' (line width of XS4)<RFX123' (line width of XS1+line width of XS2+line width of XS3) <REFX34' (line width of XS3+line width of XS4) <REFX234' (line width of XS2+line width of XS3+line width of XS4)<REFX1234' (line width of XS1+line width of XS2+ line width of XS3+line width of XS4), and, if the relationship of the CNT value at the touched Y-coordinate auxiliary electrode (=line width of touched auxiliary electrode) is such that the line width of YS1=1, the line width of YS2=2, the line width of YS3=4, and the line width of YS4=6, REFY1' (line width of YS1)<REFY2' (line width of YS2)<REFY12' (line width of YS1+line width of YS2)<REFY3' (line width of YS3)<REFY23' (line width of YS2+line width of YS3) <REFY4' (line width of YS4)<REFY123' (line width of YS1+ line width of YS2+line width of YS3)<REFY34' (line width of YS3+line width of YS4)<REFY234' (line width of YS2+ line width of YS3+line width of YS4)<REFY1234' (line width of YS1+line width of YS2+line width of YS3+line width of YS4), and it is detected in what range the values of MCNTX (CNT value of X2) and MCNTY (CNT value of Y3) are, within a predetermined numerical range of ±α (α is greater or equal to zero) of each REFX' and REFY'.

In the present embodiment, because MCNTX is in the range of REFX34' ±α (in FIG. 9, this is shown as MCNTX=REFX34'; this similarly applies to other REFX'), a value indicating that two coordinate auxiliary electrodes of XS3 and XS4 are touched is set in XSOUT (in FIG. 9, this is shown as XSOUT=XS34). Similarly, because MCNTY is in the range of REFY34' ±α (in FIG. 9, this is shown as MCNTY=REFY34'; this similarly applies to other REFY'), a value indicating that two coordinate auxiliary electrodes of YS3 and YS4 are touched is set in YSOUT (in FIG. 9, this is shown as YSOUT=YS34). When MCNTX is greater than the range of the REFX' calculated as described above (or is greater than or equal to the range of REFX'), a value indicating that four coordinate auxiliary electrodes of XS1~XS4 are simultaneously touched is set in XSOUT. Similarly, when MCNTY is greater than the range of REFY' calculated as described above (or is greater than or equal to the range of REFY'), a value indicating that four coordinate auxiliary electrodes of YS1~YS4 are simultaneously touched is set in YSOUT.

Finally, XL and YL which are line values of the X-coordinate electrode and the Y-coordinate electrode showing the peak CNT and XSOUT and YSOUT showing the coordinates of the touched auxiliary electrode which are set as described above are output to the primary control circuit 7 as coordinate data POS.

In the present embodiment, the relationship of the line widths of the auxiliary electrodes to be touched is set such that, in the X-coordinate auxiliary electrodes, (XS1)<(XS2) <(XS1+XS2)<(XS3)<(XS2+XS3)<(XS4)<(XS1+XS2+ XS3)<(XS3+XS4)<(XS2+XS3+XS4)<(XS1+XS2+XS3+ XS4) and, in the Y-coordinate auxiliary electrodes, (YS1)< (YS2)<(YS1+YS2)<(YS3)<(YS2+YS3)<(YS4)<(YS1+ YS2+YS3)<(YS3+YS4)<(YS2+YS3+YS4)<(YS1+YS2+ YS3+YS4). However, the present invention is not limited to such a configuration, and any configuration may be employed as long as the change of the electrostatic capacitances when the coordinate auxiliary electrodes are touched differ from each other and the electrostatic capacitance changes such that detection of the coordinates of the touched coordinate auxiliary electrode is possible.

In addition, in the present embodiment, with respect to each of REFX' and REFY' which are the calculated reference CNT, the coordinates of MCNTX and MCNTY are determined in a same range of ±α, but the present invention is not limited to such a configuration, and different ranges may be set to each of REFX' and REFY'.

As described, by employing an electrode pattern in which a plurality of coordinate auxiliary electrodes having different line widths extend from the X-coordinate electrode and the Y-coordinate electrode, a coordinate of the coordinate electrodes showing a digital data value having the greatest difference from the digital data value at the time of non-contact is determined, from among the digital data of the plurality of coordinate electrodes which are output from the analog-to-digital converter as a contact coordinate, and the touched coordinate is determined from among the plurality of coordinate auxiliary electrodes according to a level of the digital data value of the coordinate electrode showing the digital data value having the greatest difference from the digital data value at the time of non-contact, it is possible to detect the coordinate with a high resolution even for a small pressing area of less than or equal to the space of the X-coordinate electrodes and Y-coordinate electrodes, and, consequently, improve the operability of the user. In addition, because the number of X- and Y-coordinate electrodes is not increased, the increase in the circuit size and cost of the peripheral circuit such as the detection circuit can be suppressed.

Second Preferred Embodiment

Figure 11:
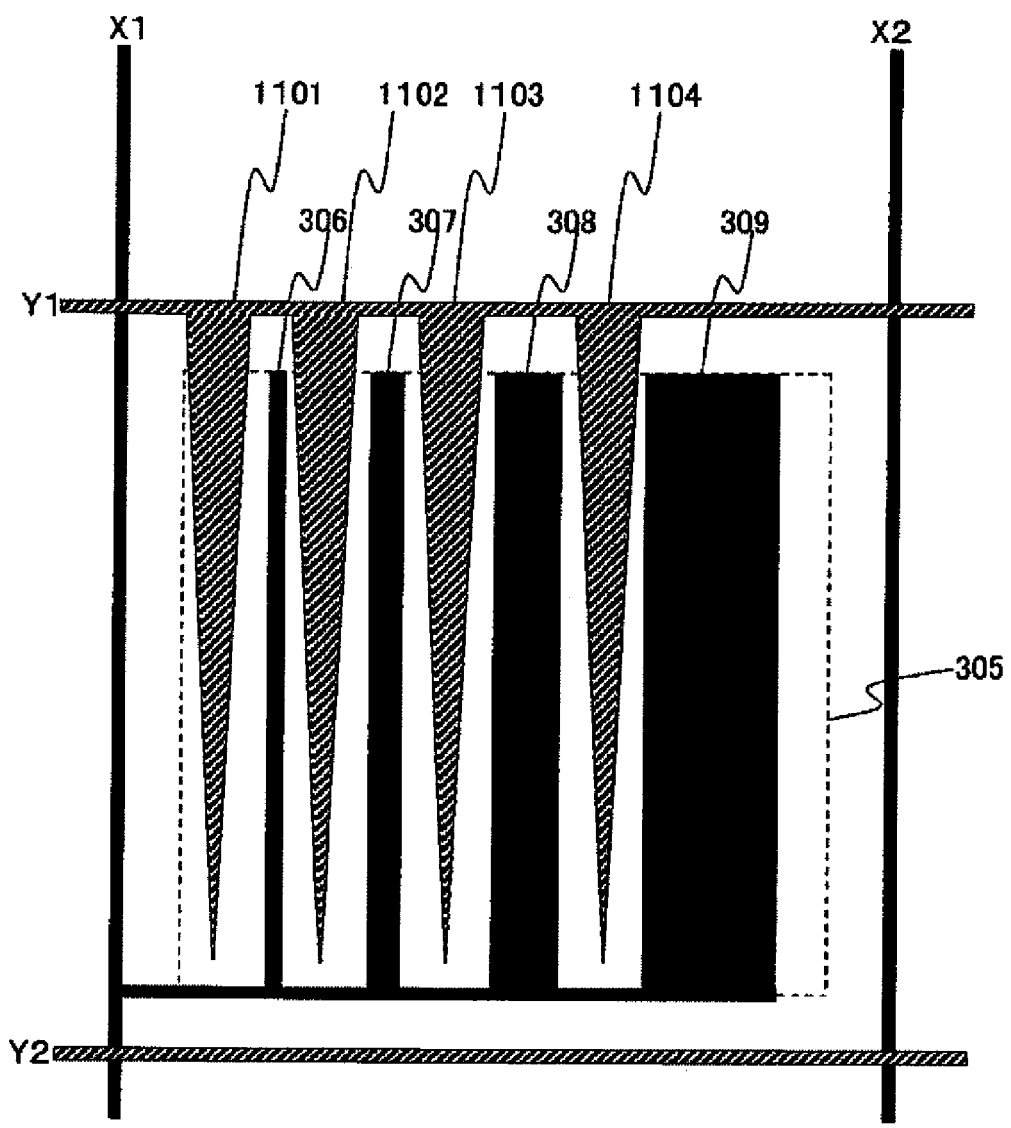
FIG. 11 is a diagrammatic plan view for explaining an example electrode pattern of X and Y electrodes included in a touch panel according to a second preferred embodiment of the present invention.

Next, a second preferred embodiment of the present invention will be described with reference to FIG. 11. FIG. 11 is a diagram corresponding to FIG. 3. In the first preferred embodiment described above, as described with reference to FIG. 3, a plurality of coordinate auxiliary electrodes having different line widths are extended from the X- and Y-coordinate electrodes (mesh shape) so that the changes of the electrostatic capacity when the coordinate auxiliary electrodes is touched differ from each other and changes of the electrostatic capacity corresponding to the position are created. In the second preferred embodiment, as shown in FIG. 11, although the X-coordinate auxiliary electrodes are similar to those in FIG. 3, the Y-coordinate auxiliary electrodes 1101~1104 have a same shape of a triangle and placed between the X-coordinate auxiliary electrodes (wedge shape). And the Y-coordinate auxiliary electrodes extend from the Y-coordinate electrode in parallel to the X-coordinate electrode. Because the Y-coordinate auxiliary electrodes have triangular shape, the line width of the Y-coordinate auxiliary electrodes is increased from the tip portion (where the line width is narrowest) to the rear end portion (where the line width is the widest), and, thus, the changes in the electrostatic capacity at various locations of touch of the Y-coordinate auxiliary electrodes would differ from each other and a change of electrostatic capacity which corresponds to the position can be created. In addition, while the shape of the X and Y electrodes in the first preferred embodiment shown in FIG. 3 is a mesh shape, because the X and Y electrodes of the present embodiment shown in FIG. 11 have wedge shapes, the X-coordinate auxiliary electrode and the Y-coordinate auxiliary electrode do not cross each other, and, thus, no intersecting capacitor exists. Therefore, a change of electrostatic capacity which is close to an ideal value can be created. In the present embodiment, the numbers of X- and Y-coordinate auxiliary electrodes are each set to 4, but the present invention is not limited to such a configuration, and the number of X- and Y-coordinate auxiliary electrodes may be increased and the resolution may be increased as long as the equations 1 and 2 described above with reference to the first preferred embodiment can be satisfied. In addition, although the Y-coordinate auxiliary electrode has its rear end portion connected to the Y-coordinate electrode, the present invention is not limited to such a configuration, and, alternatively, the tip portion and the Y-coordinate electrode may be connected. With the second preferred embodiment as described, by setting the shape of the Y-coordinate auxiliary electrode to a same triangular shape and placing the Y-coordinate auxiliary electrode between X-coordinate auxiliary electrodes, it is possible to detect the coordinates in a finer detail, and, consequently, improve the operability of the user.

Third Preferred Embodiment

Next, a third preferred embodiment of the present invention will be described with reference to FIG. 12. In the first preferred embodiment described above, as described with reference to FIG. 9, a value is calculated by multiplying the CNT increase coefficients A and B due to the line resistance, parasitic capacitance, etc., the reference CNT value of each coordinate auxiliary electrode, and a value based on coordinates of the touched line numbers XL (X1, X2, X3, X4, X5, and X6) and YL (Y1, Y2, Y3, Y4, Y5, Y6, Y7, and Y8), MCNTX and MCNTY which are peak CNTs are compared with the calculated value, and coordinates of the X- and Y-coordinate auxiliary electrodes are detected.

Figure 12:
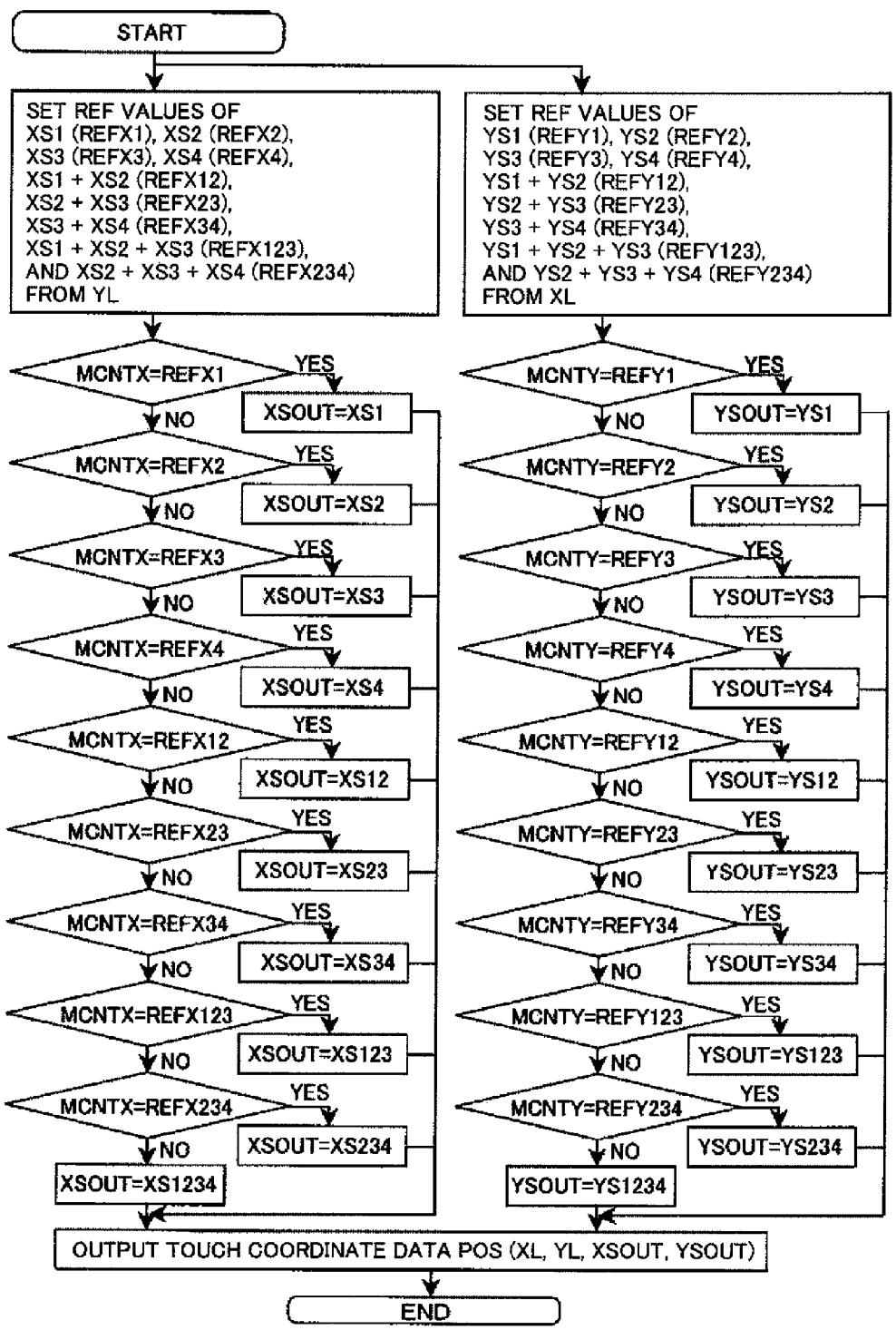
FIG. 12 is a flowchart for explaining a sequence of a calculation processor in a touch panel control circuit according to a third preferred embodiment of the present invention.

In the third preferred embodiment, however, as shown in FIG. 12, a lookup table (hereinafter referred to as "LUT") is provided in the calculation processor 602, a reference CNT value for each coordinate auxiliary electrode in each X and Y electrode during touch is held in the LUT, the CNT value related to XL and YL output from the peak coordinate detection unit 601 is set from LUT, and MCNTX and MCNTY output from the peak coordinate detection unit 601 are compared with the CNT value which is set from the LUT. Although in the present embodiment, the CNT value during touch of the X and Y electrodes in each line is held using the LUT, the present invention is not limited to such a configuration, and any configuration may be employed in which the reference CNT value for X and Y electrode during touch can be held and referenced from the detected data. In addition, in the present invention, although the reference CNT of each X and Y electrode is held in the LUT, the present invention is not limited to such a configuration, and any configuration may be employed in which the positions of the X- and Y-coordinate auxiliary electrodes can be accurately detected. For example, the LUT may hold the CNT increase coefficient of each X and Y electrode and the reference CNT of each of X and Y electrodes may be calculated based on the CNT increase coefficient. With the third preferred embodiment as described above, by holding the reference CNT value of each of the X and Y electrodes, it is possible to accurately detect the coordinates even when the change of the electrostatic capacitance in each of the X and Y electrodes varies due to, for example, variation in manufacturing.

While there have been described what are at present considered to be certain embodiments of the invention, it will be understood that various modifications may be made thereto, and it is intended that the appended claims cover all such modifications as fall within the true spirit and scope of the invention.

What is claimed is:

1. A screen input-type image display system having a touch sensor which detects a two-dimensional coordinate of a touched position on a display surface of a display device, wherein the touch sensor comprises a plurality of X-coordinate electrodes, a plurality of Y-coordinate electrodes which are placed crossing the X-coordinate electrodes with an insulating layer therebetween, a plurality of X-coordinate auxiliary electrodes which are extended in each area between the X-coordinate electrodes, and a plurality of Y-coordinate auxiliary electrodes which are extended in each area between the Y-coordinate electrodes, the X-coordinate electrodes and the Y-coordinate electrodes being placed in a two-dimensional matrix form on the display surface of the display device for detecting a change in capacitance due to pressing, the plurality of X-coordinate auxiliary electrodes extend from the X-coordinate electrode, and are formed with a same length and differing line widths from each other, the plurality of Y-coordinate auxiliary electrodes placed opposing the plurality of X-coordinate auxiliary electrodes with the insulating layer therebetween extend from the Y-coordinate electrode, are formed with a same length and differing line widths from each other, and are placed crossing each of the X-coordinate auxiliary electrodes, the plurality of X-coordinate auxiliary electrodes and the plurality of Y-coordinate auxiliary electrodes are formed in a region surrounded by a pair of adjacent X-coordinate electrodes and a pair of adjacent Y-coordinate electrodes, the plurality of X-coordinate auxiliary electrodes have electrode shapes in which the line widths are sequentially increased along a direction of provision of the plurality of X-coordinate auxiliary electrodes, the plurality of Y-coordinate auxiliary electrodes have electrode shapes in which the line widths are sequentially increased along a direction of provision of the plurality of Y-coordinate auxiliary electrodes, the screen input-type image display system comprises a detection circuit which detects a change of capacitance between the X-coordinate electrode and the Y-coordinate electrode of the touch sensor, an analog-to-digital converter which converts a detection output of the detection circuit to digital data, a touch panel control circuit which determines a touched coordinate, a primary control circuit which receives an input of touch coordinate data of the touch panel control circuit and which integrally controls the overall device, and a display control circuit which controls display of the display device, the primary control circuit determines occurrence of touch by user and a coordinate of the touch from the touch coordinate data, supplies a display signal corresponding to the determined coordinate through the display control circuit to the display device, and reflects on the display, the touch panel control circuit determines, from digital data of the plurality of X-coordinate electrodes output from the analog-to-digital converter, a coordinate of an X-coordinate electrode showing a digital data value having a greatest difference from a digital data value at the time of non-contact as a contact coordinate, and determines, from digital data of the plurality of Y-coordinate electrodes output from the analog-to-digital converter, a coordinate of a Y-coordinate electrode showing a digital data value having a greatest difference from a digital data value at the time of non-contact as a contact coordinate, and a coordinate of a touched X-coordinate auxiliary electrode is determined from among the plurality of X-coordinate auxiliary electrodes according to a level of a digital data value of the X-coordinate electrode showing the digital data value having the greatest difference from the digital data value at the time of non-contact, and a coordinate of a touched Y-coordinate auxiliary electrode is determined from among the plurality of Y-coordinate auxiliary electrodes according to a level of a digital data value of the Y-coordinate electrode showing the digital data value having the greatest difference from the digital data value at the time of non-contact, to output a coordinate of the contact position.

2. The screen input-type image display system according to claim 1, wherein the plurality of Y-coordinate auxiliary electrodes have a same triangular shape extending in a direction perpendicular to the Y-coordinate electrodes, and are alternately arranged without crossing the X-coordinate auxiliary electrodes which are placed opposing the Y-coordinate auxiliary electrodes with the insulating layer therebetween, the plurality of X-coordinate auxiliary electrodes and the plurality of Y-coordinate auxiliary electrodes are formed in a region surrounded by a pair of adjacent X-coordinate electrodes and a pair of adjacent Y-coordinate electrodes, the plurality of X-coordinate auxiliary electrodes extend in a same direction as a direction of extension of the Y-coordinate auxiliary electrodes and have a same length and differing line widths from each other, the plurality of X-coordinate auxiliary electrodes have the line widths sequentially increased along a direction of provision of the plurality of X-coordinate auxiliary electrodes, and the Y-coordinate auxiliary electrodes having the triangular shape are connected to the Y-coordinate electrode at a wide-width section of the Y-coordinate auxiliary electrode.

3. The screen input-type image display system according to claim 1, wherein the touch panel control circuit comprises a storage circuit which stores a digital data value when each of the X-coordinate auxiliary electrodes or each of the Y-coordinate auxiliary electrodes is touched, and the coordinates of the touched X-coordinate auxiliary electrode and the touched Y-coordinate auxiliary electrode are determined by comparing a digital data value of a touched X-coordinate electrode and a touched Y-coordinate electrode with the digital data value stored in the storage circuit.

4. The screen input-type image display system according to claim 3, wherein if a difference in a digital data value is caused in each touched X-coordinate electrode and each touched Y-coordinate electrode and the difference in the digital data value can be calculated from a predetermined coefficient corresponding to coordinates of the X-coordinate electrode and the Y-coordinate electrode, the storage circuit stores the coefficient, and a digital data value of the X-coordinate auxiliary electrode and the Y-coordinate auxiliary electrode for each line which forms a coordinate determination reference is calculated from the coordinates of the touched X-coordinate electrode and the touched Y-coordinate electrode, the coefficient stored in the storage circuit, and the digital data values when each X-coordinate auxiliary electrode and each Y-coordinate auxiliary electrode are touched stored in the storage circuit, the digital data values of the touched X-coordinate electrode and the touched Y-coordinate electrode are compared with the calculated digital data values of the X-coordinate auxiliary electrodes and the Y-coordinate auxiliary electrodes for each line which forms the determination reference, and the coordinates of the touched X-coordinate auxiliary electrode and the touched Y-coordinate auxiliary electrode are determined.

5. The screen input-type image display system according to claim 3, wherein if a difference in a digital data value is caused in each touched X-coordinate electrode and each touched Y-coordinate electrode, digital data values when touched for each X-coordinate auxiliary electrode for each X-coordinate electrode and for each Y-coordinate auxiliary electrode for each Y-coordinate electrode are stored in the storage circuit, the digital data values of the touched X-coordinate electrode and the touched Y-coordinate electrode are compared with the digital data values for each X-coordinate auxiliary electrode for each X-coordinate electrode and for each Y-coordinate auxiliary electrode for each Y-coordinate electrode stored in the storage circuit, and the coordinates of the touched X-coordinate auxiliary electrode and the touched Y-coordinate auxiliary electrode are determined.

6. A screen input-type image display system having a touch sensor which detects a two-dimensional coordinate of a touched position on a display surface of a display device, wherein the touch sensor comprises a plurality of X-coordinate electrodes, a plurality of Y-coordinate electrodes which are placed crossing the X-coordinate electrodes with an insulating layer therebetween, a plurality of X-coordinate auxiliary electrodes which are extended in each area between the X-coordinate electrodes, and a plurality of Y-coordinate auxiliary electrodes which are extended in each area between the Y-coordinate electrodes, the X-coordinate electrodes and the Y-coordinate electrodes being placed in a two-dimensional matrix form on the display surface of the display device for detecting a change in capacitance due to pressing, the plurality of X-coordinate auxiliary electrodes extend from the X-coordinate electrode, and are formed with a same length and differing line widths from each other, the plurality of Y-coordinate auxiliary electrodes have a same triangular shape extending in a direction perpendicular to the Y-coordinate electrode, and are alternately placed without crossing the X-coordinate auxiliary electrodes placed opposing the Y-coordinate auxiliary electrodes with the insulating layer therebetween, the plurality of X-coordinate auxiliary electrodes and the plurality of Y-coordinate auxiliary electrodes are formed in a region surrounded by a pair of adjacent X-coordinate electrodes and a pair of adjacent Y-coordinate electrodes, the plurality of X-coordinate auxiliary electrodes extend in a same direction as a direction of extension of the Y-coordinate auxiliary electrode, and have a same length and differing line width from each other, the plurality of X-coordinate auxiliary electrodes have the line widths sequentially increased along a direction of provision of the plurality of X-coordinate auxiliary electrode, and the Y-coordinate auxiliary electrodes having the triangular shape have an electrode shape in which the Y-coordinate auxiliary electrode is connected to the Y-coordinate electrode at a wide-width section of the Y-coordinate auxiliary electrode, the screen input-type image display system comprises a detection circuit which detects a change of capacitance between the X-coordinate electrode and the Y-coordinate electrode of the touch sensor, an analog-to-digital converter which converts a detection output of the detection circuit to digital data, a touch panel control circuit which determines a touched coordinate, a primary control circuit which receives an input of touch coordinate data of the touch panel control circuit and which integrally controls the overall device, and a display control circuit which controls display of the display device, the primary control circuit determines occurrence of touch by user and a coordinate of the touch from the touch coordinate data, supplies a display signal corresponding to the determined coordinate through the display control circuit to the display device, and reflects on the display, and the touch panel control circuit determines, from digital data of the plurality of X-coordinate electrodes output from the analog-to-digital converter, a coordinate of an X-coordinate electrode showing a digital data value having a greatest difference from a digital data value at the time of non-contact as a contact coordinate, determines, from digital data of the plurality of Y-coordinate electrodes output from the analog-to-digital converter, a coordinate of a Y-coordinate electrode showing a digital data value having a greatest difference from a digital data value at the time of non-contact as a contact coordinate, determines the coordinate of the touched X-coordinate auxiliary electrode from among the plurality of X-coordinate auxiliary electrodes according to a level of a digital data value of the X-coordinate electrode showing the digital data value having the greatest difference from the digital data value at the time of non-contact, determines the coordinate of the touched Y-coordinate auxiliary electrode from among the plurality of Y-coordinate auxiliary electrodes according to a level of a digital data value of the Y-coordinate electrode showing the digital data value having the greatest difference from the digital data value at the time of non-contact, and outputs the coordinates of the contact position.

* * * * *